United States Patent
Arai et al.

[11] Patent Number: 6,082,341
[45] Date of Patent: Jul. 4, 2000

[54] SUPERCHARGER FOR ENGINE

[75] Inventors: Nobukatsu Arai, Ushiku; Seiji Sakagami, Ibaraki-ken; Tsutomu Okazaki, Ryugasaki; Tetsuo Udagawa, Hitachinaka, all of Japan

[73] Assignee: Hitachi, Ltd., Tokyo, Japan

[21] Appl. No.: 09/136,310

[22] Filed: Aug. 19, 1998

[30] Foreign Application Priority Data

Aug. 19, 1997 [JP] Japan .................................... 9-222349

[51] Int. Cl.$^7$ ................................................... F02B 33/42
[52] U.S. Cl. ......................................... 123/559.2; 417/64
[58] Field of Search ............................. 123/559.2; 417/64

[56] References Cited

FOREIGN PATENT DOCUMENTS

| | | |
|---|---|---|
| 59-36715 | 10/1984 | Japan . |
| 60-150427 | 8/1985 | Japan . |
| 3-182628 | 8/1991 | Japan . |
| 4-94419 | 3/1992 | Japan . |

OTHER PUBLICATIONS

Kanesaka et al., "In Search for Ultimate Engine, Second Series", published Feb. 20, 1991 by Sanei Shobo.
"Literature of Japan Mechanical Engineering Association", vol. 40, 336 (Aug. 1974), pp. 2197–2208.

*Primary Examiner*—Noah P. Kamen
*Attorney, Agent, or Firm*—Antonelli, Terry, Stout & Kraus, LLP

[57] ABSTRACT

There is disclosed a supercharger for an engine in which intake air is increased in pressure by the use of exhaust gas flowed into the supercharger from the engine, and is fed to the engine. An impeller 2, having a plurality of blades formed on an outer peripheral portion thereof, is received within a casing 1, and a ring-like fluid passage is formed around the plurality of blades, and a first partition 3 and a second partition 4 are provided in the fluid passage to divide this fluid passage into two fluid passages, that is, an exhaust gas passage 6 and an intake air passage 9. There is provided a fluid machine construction for causing the exhaust gas of the engine to flow into and out of the exhaust gas passage, and for causing the intake air to flow into and out of the intake air passage. With this construction, the pressure of the intake air can be satisfactorily increased over a wide range of the engine speed from a low speed to a relatively high speed, and therefore the supercharging of the engine can be effected with the inexpensive machine construction.

11 Claims, 12 Drawing Sheets

SUPERCHARGER FOR ENGINE

BACKGROUND OF THE INVENTION

This invention relates to a supercharger which compresses the air, drawn thereinto from the exterior, and feeds it to an engine.

As superchargers for an automobile engine, there are well known a turbocharger, comprising an exhaust gas turbine and a centrifugal compressor, and displacement compressors (called a supercharger) such as a Roots type, a Lysholm type (screw type) and a scroll type (spiral type).

There are also known a pressure wave-type supercharger, which compresses intake air, utilizing pressure waves of exhaust gas, and a supercharger called a complex device. These are described in detail, for example, in "In Search For Ultimate Engine, Second Series" (written by Hiroshi Kanesaka, and published Feb. 20th, 1991 by Sanei Shobo).

In a turbocharger, a turbine is rotated by the pressure of exhaust gas, so that a centrifugal impeller, mounted coaxially therewith, is rotated to compress intake air. The energy, possessed by the exhaust gas, can be recovered, but the pressure of the intake air can not be sufficiently increased in a low engine speed range in which the flow rate of the exhaust gas is low.

On the other hand, in a supercharger or a pressure wave-type supercharger using a displacement compressor, the pressure of the intake air can be sufficiently increased even in a low engine speed range, but since these superchargers are driven through a belt operatively connected to the engine, or by an electric motor, part of the engine power is consumed for driving purposes.

Usually, in a pressure wave-type supercharger as disclosed in Japanese Patent Unexamined Publication Nos. 60-150427 and 4-94419, a cylindrical rotor, having a plurality of cells therein, is rotated in synchronism with the rotation of an engine, and exhaust gas is introduced into the rotor through part of one end of the rotor while intake air is introduced into the rotor through part of the other end thereof, thereby exchanging the pressures. It is said that this supercharger is suited particularly for a diesel engine, and an effective supercharging effect can be obtained even during a low-speed operation, but since the intake air and the exhaust gas are brought into contact with each other within the rotor, the partial mixing between the intake air and the exhaust gas is inevitable.

There is known the type of pressure wave-type supercharger as disclosed in Japanese Patent Unexamined Publication No. 3-182628, in which a rotor has cells inclined radially, so that a revolving force is imparted to the rotor, or a centrifugal force is exerted on intake air and exhaust gas, thereby assisting in a scavenging operation. With this construction, the cost can be reduced, but generally, the cost of the pressure wave-type supercharger of this type is high.

Next, an impeller, used in the present invention, will be described. This impeller is basically similar in construction to impellers used in a westco pump and an eddy-flow blower, disclosed for example in Japanese Utility Model Examined Publication No. 59-36715 and "Literature of Japan Mechanical Engineering Association" (Vol.40, 336 (August, 1974), p2197–2208), and impellers used in a fluid machine (disclosed in other literature) called a regenerating fluid machine, a periphery pump and so on.

Namely, this impeller basically comprises a plurality of fluid pressure-increasing blades (or vanes) formed radially on a disk-shaped base (body) at an outer peripheral portion thereof, and in one type of such impeller, the plurality of blades are formed on one side (face) of the disk at the outer peripheral portion thereof, and in the other type, the plurality of blades are formed on the opposite sides of the disk at the outer peripheral portion thereof.

In a conventional pump or a conventional blower, such an impeller is received within a casing in such a manner that a ring-like fluid passage is formed around the blades of the impeller, and one partition wall, which separates a fluid inlet and a fluid outlet from each other, is provided in the fluid passage in such a manner that the partition wall will not hinder the rotation of the impeller.

The impeller is rotated by a motor or an engine, and a fluid is drawn through the fluid inlet provided on one side of the partition wall, and the fluid is subjected to several centrifugal compression operations by the plurality of blades to be increased in pressure, and is discharged through the fluid outlet provided on the other side of the partition wall. Since the fluid is subjected to several centrifugal compression operations, there is provided a feature that the pressure can be increased greatly even at a relatively low rotational speed.

SUMMARY OF THE INVENTION

It is an object of this invention to provide a supercharger for an engine in which intake air is increased in pressure by the use of exhaust gas flowed into the supercharger from the engine, and is fed to the engine, and the good supercharging can be effected over a wide range of the engine speed from a low speed to a relatively high speed.

According to one aspect of the present invention, there is provided a supercharger for an engine comprising a disk-like impeller having a plurality of blades formed on an outer peripheral portion thereof, and a casing within which the impeller is rotatably received, the casing forming a ring-like fluid passage around the plurality of blades;

wherein a first partition and a second partition are provided in the fluid passage to divide the fluid passage into a first fluid passage and a second fluid passage, and an exhaust gas inlet for introducing exhaust gas of the engine is provided in that portion of the first fluid passage disposed adjacent to the first partition, and an exhaust gas outlet is provided in that portion of the first fluid passage disposed adjacent to the second partition, and an intake air inlet for drawing air is provided in that portion of the second fluid passage across the second partition from the exhaust gas outlet, and an intake air outlet is provided in that portion of the second fluid passage across the first partition from the exhaust gas inlet.

Preferably, a gap for allowing pressure waves of the exhaust gas pass through is formed between at least one of the first and second partitions and ends of the blades of the impeller.

Preferably, a width of the first partition, as well as a width of the second partition, is smaller than the pitch of the blades of the impeller.

Preferably, the impeller has the plurality of blades formed on opposite sides thereof at the outer peripheral portion thereof, and the blades, formed on one side of the impeller are staggered with respect to the blades formed on the other side thereof.

Preferably, at least one of the exhaust gas inlet and the intake air inlet is so arranged that a flow of the exhaust gas through the exhaust gas inlet or a flow of the air through the intake air inlet is substantially parallel to an axis of the impeller, and at least one of the exhaust gas outlet and the intake air outlet is so arranged that a flow of the air through the exhaust gas outlet or a flow of the air through the intake air outlet is directed radially outwardly of the impeller.

Preferably, casing-cooling means is provided on an outer end surface of the casing disposed substantially parallel to the fluid passage.

Preferably, an exhaust gas passage for circulating the exhaust gas and a valve device for opening and closing the exhaust gas passage are provided in one of the first and second partitions.

Preferably, an external drive mechanism for assisting the impeller in rotating is connected to the impeller.

According to another aspect of the invention, there is provided a supercharger for an engine wherein intake air is increased in pressure by the use of exhaust gas flowed into the supercharger from the engine, and is fed to the engine; wherein an impeller, having a plurality of blades formed on an outer peripheral portion thereof, is received within a casing, and a ring-like fluid passage is formed around the plurality of blades, and a first partition and a second partition are provided in the fluid passage to divide the fluid passage into an exhaust gas passage and an intake air passage, and there is provided a fluid machine construction for causing the exhaust gas to flow into and out of the exhaust gas passage, and for causing the intake air to flow into and out of the intake air passage, and pressure energy, possessed by the exhaust gas in the exhaust gas passage, is exerted as pressure waves on the intake air in the intake air passage, and also flow energy, possessed by the exhaust gas, is recovered as a rotational force for rotating the impeller, thereby increasing the pressure of the intake air.

According to a further aspect of the invention, there is provided a supercharging system for an engine employing the supercharger as defined above, in which the air, pressurized by the eddy flow-type supercharger, is ejected through an ejector nozzle directed toward a downstream portion of a main intake air passage.

According to a further aspect of the invention, there is provided an engine supercharging system employing a turbocharger using a centrifugal impeller, wherein the turbocharger and the above supercharger are used in combination with each other.

In the present invention, the impeller has the plurality of blades formed on the outer peripheral portion thereof. The impeller is rotatably received within the casing, and the casing forms the ring-like fluid passage around the plurality of blades. The first partition and the second partition are provided in the fluid passage to divide the fluid passage into the first fluid passage and the second fluid passage. The exhaust gas inlet for introducing exhaust gas of the engine is provided in that portion of the first fluid passage disposed adjacent to the first partition, and the exhaust gas outlet is provided in that portion of the first fluid passage disposed adjacent to the second partition. The intake air inlet for drawing the air is provided in that portion of the second fluid passage across the second partition from the exhaust gas outlet, and the intake air outlet is provided in that portion of the second fluid passage across the first partition from the exhaust gas inlet.

With this construction, the pressure of the intake air can be satisfactorily increased over a wide range of the engine speed from a low speed to a relatively high speed, and therefore the supercharging of the engine can be effected with the inexpensive machine construction.

The gap for allowing the pressure waves of the exhaust gas pass through is formed between at least one of the first and second partitions and the ends of the blades of the impeller, and with this construction the pressure increase by the pressure waves is effectively achieved.

The width of the first partition, as well as the width of the second partition, is smaller than the pitch of the blades of the impeller, and with this construction, also, the pressure increase by the pressure waves is effectively achieved.

The impeller has the plurality of blades formed on the opposite sides thereof at the outer peripheral portion thereof, and the blades, formed on one side of the impeller are staggered with respect to the blades formed on the other side thereof. With the use of this impeller, the pressure increase by the pressure waves is effectively achieved.

At least one of the exhaust gas inlet and the intake air inlet is so arranged that the flow of the exhaust gas through the exhaust gas inlet or the flow of the air through the intake air inlet is substantially parallel to the axis of the impeller, and at least one of the exhaust gas outlet and the intake air outlet is so arranged that the flow of the air through the exhaust gas outlet or the flow of the air through the intake air outlet is directed radially outwardly of the impeller. With this construction, flow losses of the intake air and exhaust gas can be reduced, and the pressure increase is achieved by the effective rotation of the impeller and the rotational force.

The casing-cooling means, such as air-cooled fins and a water-cooled jacket, is provided on the outer end surface of the casing. With this construction, the temperature rise of the intake air and the temperature rise of bearings (lubricating oil) can be suppressed, and the supercharging efficiency and the reliability can be enhanced.

The exhaust gas passage for circulating the exhaust gas (EGR) and the valve device for opening and closing the exhaust gas passage are provided in one of the first and second partitions. With this construction, separate piping for EGR is not needed, and the piping can be simplified.

The external drive mechanism for assisting the impeller in rotating is connected to the impeller. With this construction, the incomplete starting of the engine, as well as the unnecessary intake air resistance during a low-speed operation, is eliminated.

DESCRIPTION OF THE PREFERRED EMBODIMENTS

Preferred embodiments of a supercharger of the present invention for an engine will now be described with reference to the drawings.

Figure 1:
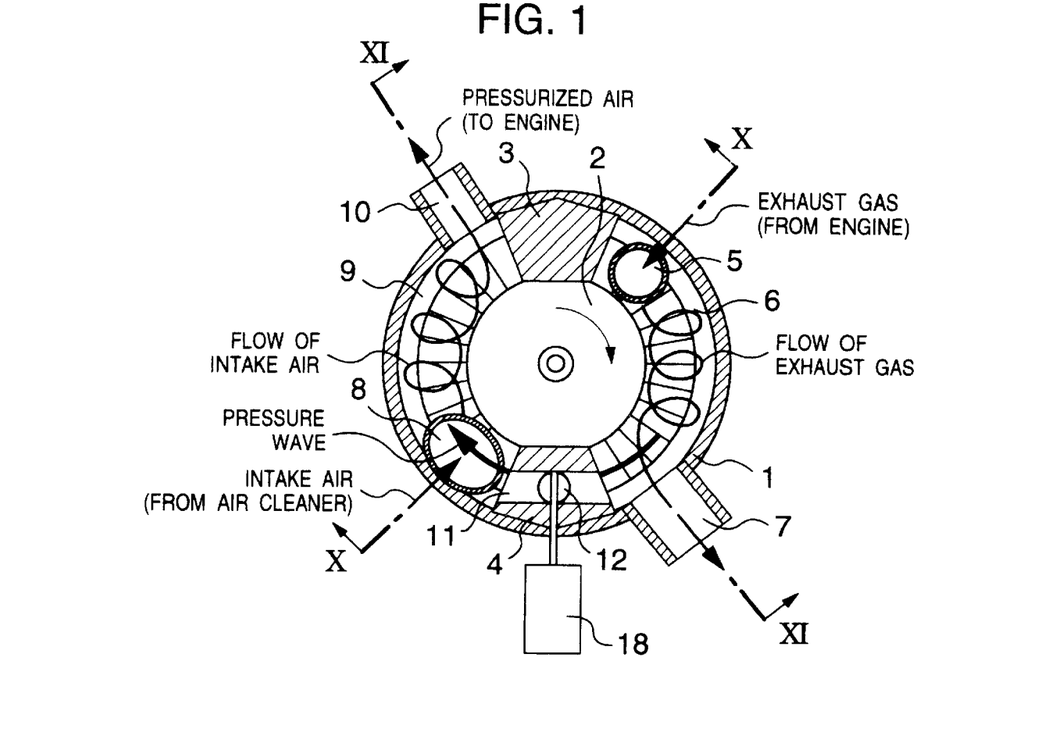
FIG. 1 a view showing the construction of a first embodiment of a supercharger of the present invention, which is close to a cross-sectional view thereof in a radial direction.
Figure 2:
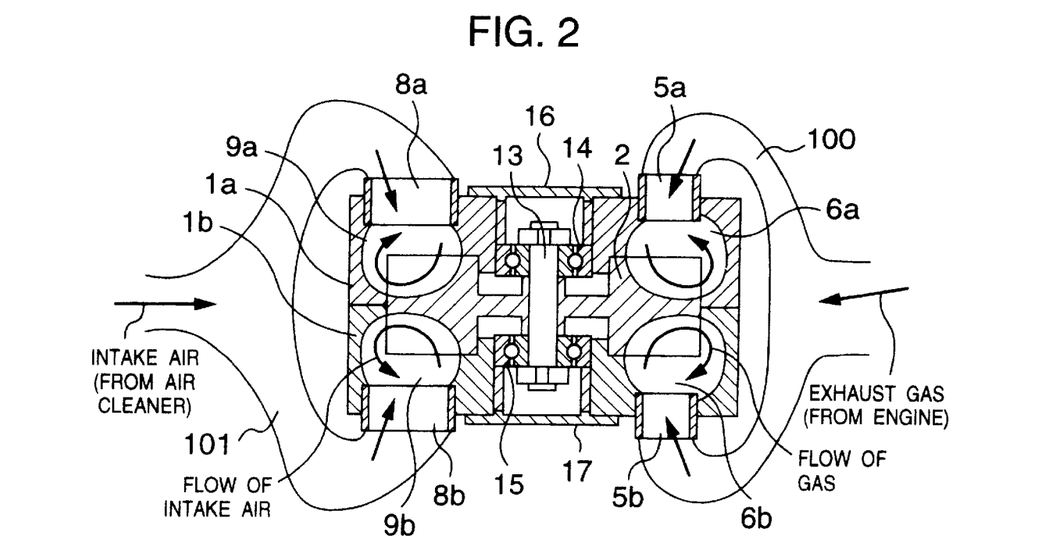
FIG. 2 is a cross-sectional view taken along the line X—X of FIG. 1.
Figure 3:
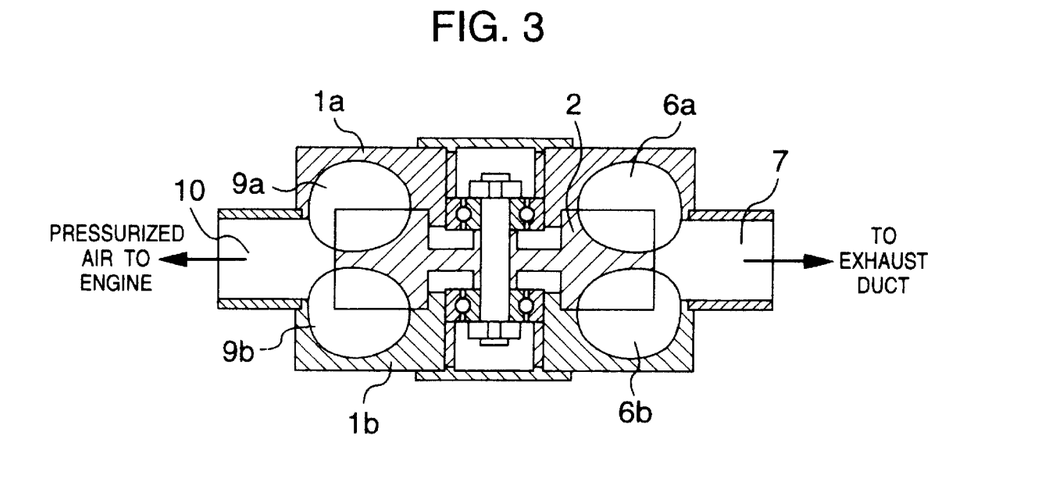
FIG. 3 is a cross-sectional view taken along the line XI—XI of FIG. 1.
Figure 4:
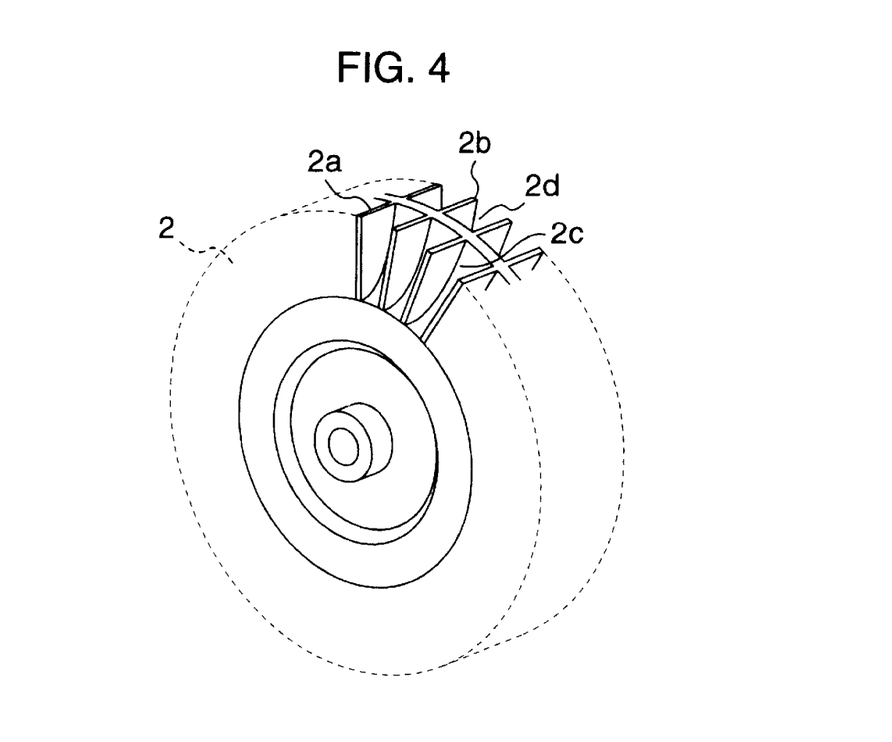
FIG. 4 is a detailed view of a portion of an impeller 2 of the first embodiment.
Figure 5:
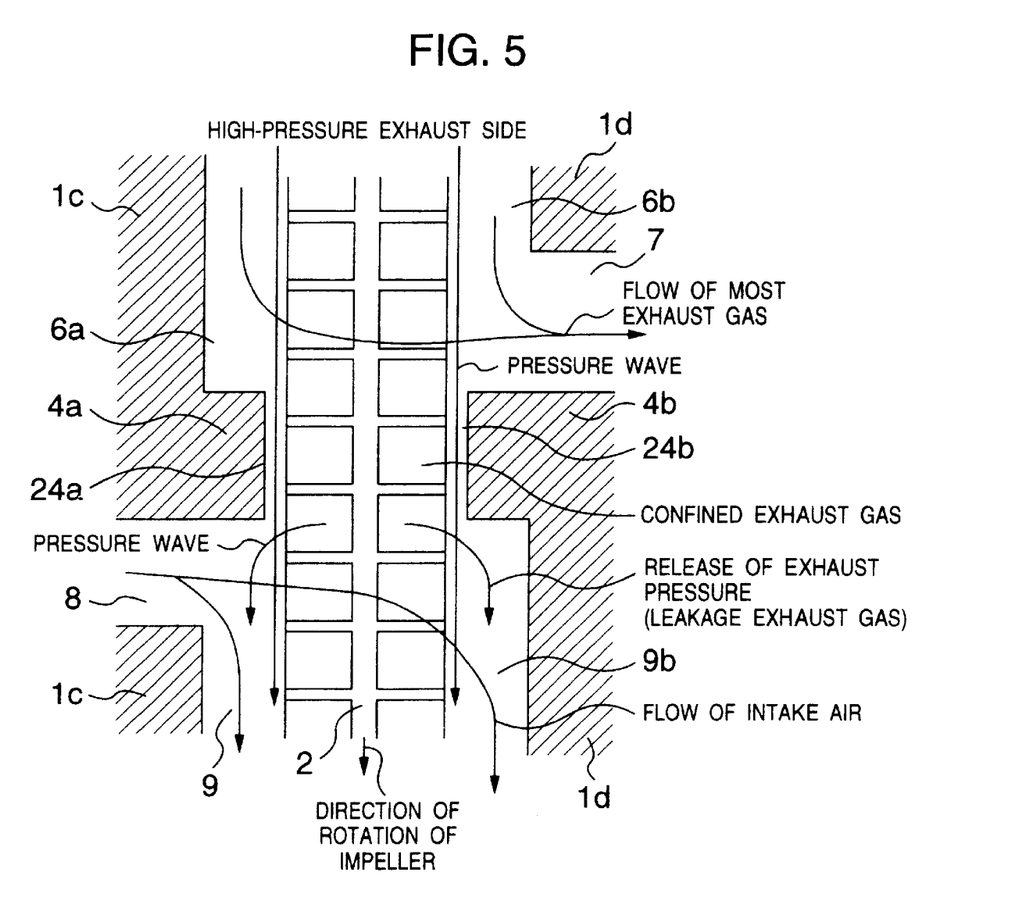
FIG. 5 is a developed view showing the impeller 2 and second partitions 4 of the first embodiment.

The first embodiment of the invention will be described with reference to FIGS. 1 to 5. FIG. 1 a view showing the construction of the supercharger of the first embodiment, which is close to a cross-sectional view thereof in a radial direction. FIG. 2 is a cross-sectional view taken along the line X—X of FIG. 1, FIG. 3 is a cross-sectional view taken along the line XI—XI of FIG. 1, FIG. 4 is a detailed view of a portion of an impeller 2 of the first embodiment, and FIG. 5 is a developed view showing the impeller 2 and second partitions 4.

The impeller 2 includes a plurality of blades (or vanes) 2a and 2b formed on opposite sides or faces of a disk at an outer peripheral portion thereof, and has fluid passages 2c and 2d each formed between the adjacent blades, each of the fluid passages 2c and 2d being in the form of a groove. Casings 1a and 1b form two fluid passages (each having a smoothly-curved crosssectional shape, such as an ovoid shape, a generally circular shape or a generally oval shape, when viewed in combination with the groove portions 2c and 2d of the impeller 2), that is, exhaust gas passages 6a and 6b (serving as a first fluid passage) and intake air passages 9a and 9b (serving as a second fluid passage), at the outer peripheral portion of the impeller 2. Namely, the ring-shaped fluid passages 6a, 6b, 9a and 9b are formed around the plurality of blades.

The fluid passages are divided by first partitions 3 (3a and 3b) and second partitions 4a and 4b. The first partitions 3 (3a and 3b), as well as the second partitions 4a and 4b, may be formed integrally with the casings 1a and 1b, respectively, or may be formed separately from the casings 1a and 1b, respectively. In this embodiment, the first partitions 3 and the second partitions 4 are circumferentially spaced 180 degrees from each other about a rotation axis 13.

A width (in a direction of the pitch of the blades) of that surface of each of the first partitions 3a and 3b, facing the impeller 2, is larger than the pitch of the blades, and similarly a width (in the direction of the pitch of the blades) of that surface of each of the second partitions 4a and 4b, facing the impeller 2, is larger than the pitch of the blades.

Exhaust gas inlets 5 are provided on one side of the first partitions 3 in such a manner that the direction of flow of exhaust gas through these exhaust gas inlets 5 is substantially parallel to the axis of the impeller, and an intake air outlet 10 is provided on the other side of the first partitions 3 in such a manner that a flow of the air through this intake air outlet 10 is directed radially outwardly of the impeller 2. Similarly, an exhaust gas outlet 7 is provided on one side of the second partitions 4, and intake air inlets 8 are provided on the other side of the second partitions 4.

With this construction, the exhaust gas passages 6 and the intake air passages 9 are formed. An EGR passage 11 is provided in the second partitions 4, and a valve 12 is provided in this passage 11. The degree of opening of the valve 12 is controlled by an opening-closing mechanism 18 such as a motor. A rotation shaft 13 of the impeller 2 is supported by bearings 14 and 15. Reference numerals 16 and 17 denote bearing box covers.

Exhaust gas from the engine flows into the exhaust gas inlets 5a and 5b through an exhaust gas duct 100, and flows through the exhaust gas passages 6a and 6b. At this time, this flow has behaviors as shown in FIGS. 1 and 2, and imparts a rotational force to the impeller 2. On the other hand, pressure waves of the exhaust gas pass through gaps 24a and 24b, which are formed respectively between the second partition 4a and the impeller 2 and between the second partition 4b and the impeller 2, and propagate to the intake air passages 9a and 9b as shown in FIG. 5. In FIG. 5, reference numerals 1c and 1d denote casing walls.

On the other hand, the intake air from an air cleaner is introduced into the intake air inlets 8a and 8b through an intake air duct 101, and is pressurized by the pressure waves of the exhaust gas, and also is supplied with a centrifugal force between the blades of the rotating impeller 2, so that the intake air flows as shown in FIGS. 1 and 2, and undergoes a pressure-increasing operation The thus pressurized intake air is fed to the engine via the intake air outlet 10.

In the construction of the supercharger of this embodiment for the engine, most of the exhaust gas is discharged through the exhaust gas outlet 7, but part of the exhaust gas is confined in the grooves between the blades, and another part of the exhaust gas leaks through the gaps 24a and 24b, and therefore the mixture or intrusion of the exhaust gas into the intake air can not be reduced to zero. However, in recent engines, EGR is effected in a wide operation range, and the mixture of the exhaust gas is much like this EGR, and therefore is thought to be allowed. In the type of engine system in which the operation should be effected with EGR kept to zero, there is provided piping bypassing this supercharger.

Figure 6:
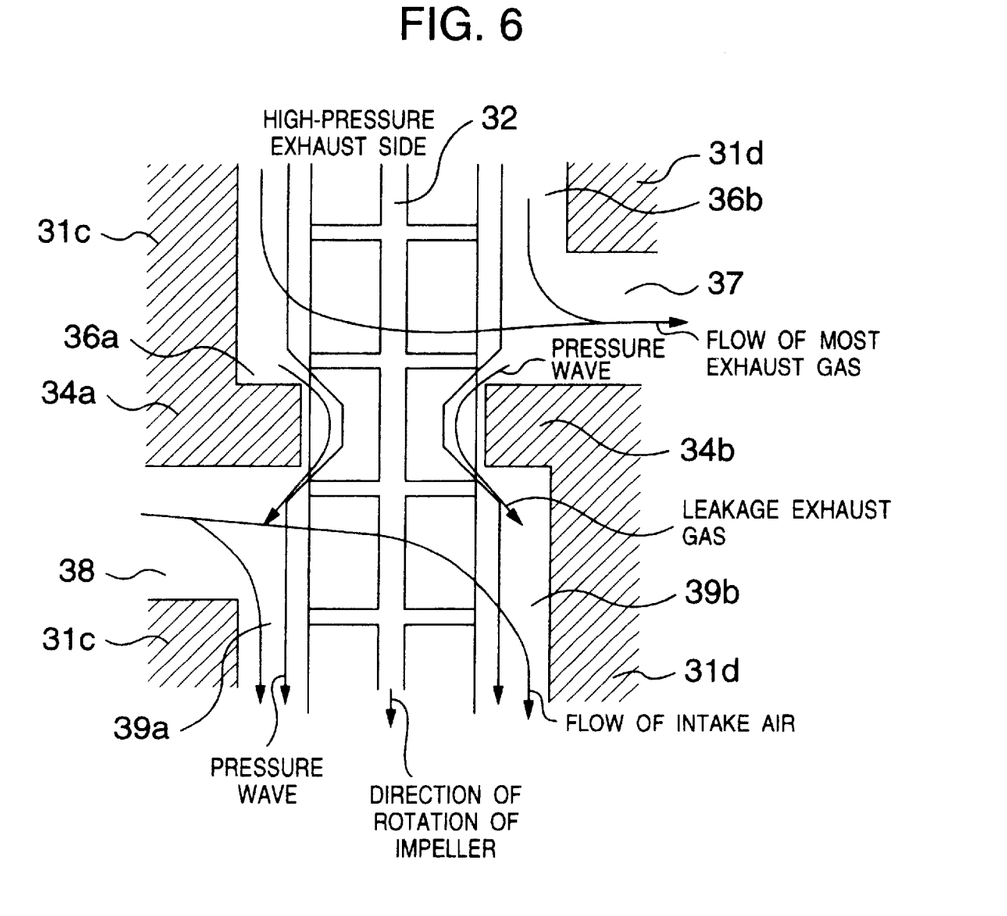
FIG. 6 is a developed view showing an impeller 32 and second partitions 34 of a second embodiment of the invention.

FIG. 6 shows a second embodiment. In FIG. 6, reference numerals 31c and 31d denote casing walls, reference numeral 32 an impeller, reference numerals 34a and 34b second partitions, reference numerals 36a and 36b exhaust gas passages, reference numeral 37 an exhaust gas outlet, reference numeral 38 an intake air inlet, and reference numerals 39a and 39b intake air passages.

This embodiment is similar in basic construction to the first embodiment, but with the combination of the impeller 32, having blades whose pitch is large, and the second partitions 34a and 34b having a width smaller than the pitch of the blades, the propagation of pressure waves of exhaust gas is more promoted. In this case, gaps, corresponding respectively to the gaps 24a and 24b (FIG. 5), may be small.

Figure 7:
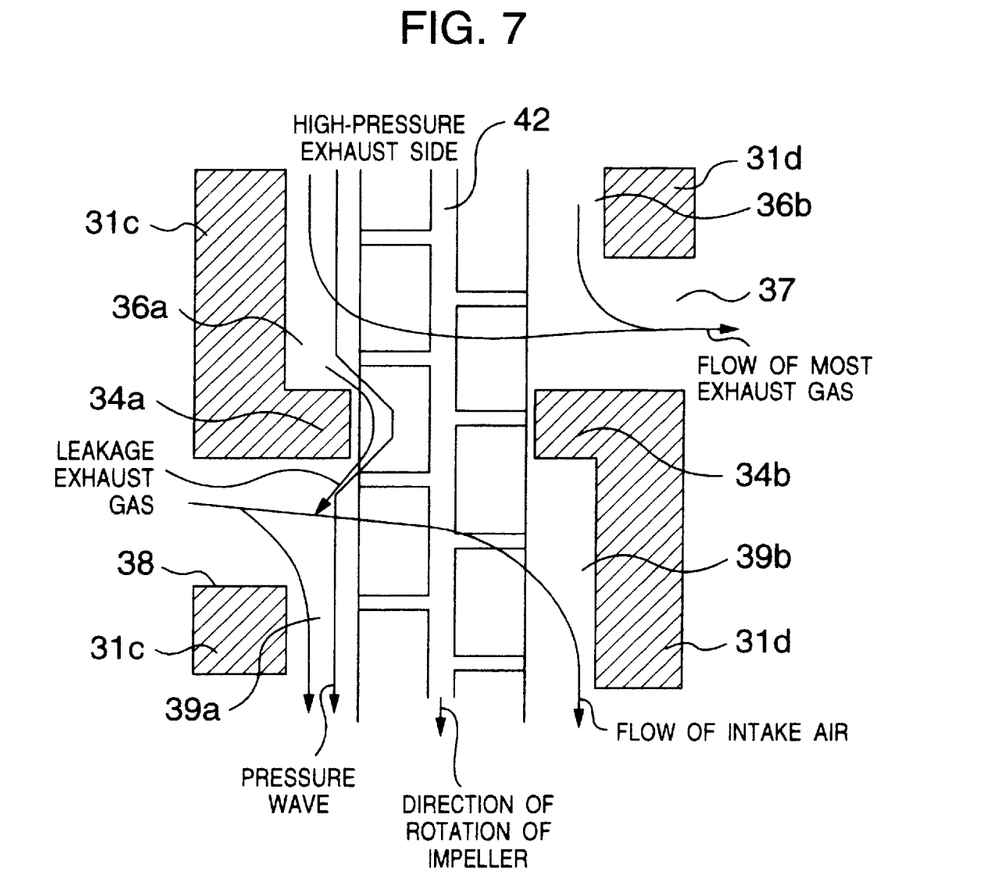
FIG. 7 is a developed view showing an impeller 22 and second partitions 34 of a third embodiment of the invention.

FIG. 7 shows a third embodiment. This embodiment is similar in basic construction to the first embodiment. Reference numeral 42 denotes an impeller. This embodiment is identical to the second embodiment in the concept that with the combination of the impeller 42, having blades whose pitch is large, and second partitions having a width smaller than the pitch of the blades, the propagation of pressure waves of exhaust gas is more promoted.

However, this embodiment is different in that the blades, formed on one side of the impeller 42 (which has the blades formed on the opposite sides thereof) are staggered with respect to the blades formed on the other side thereof. With this construction in which the blades on one side of the impeller are arranged in staggered relation to the blades on the other side thereof, there is achieved an advantage that a time period, during which pressure waves of exhaust gas are shut off by the blades, can be reduced by half.

Figure 8:
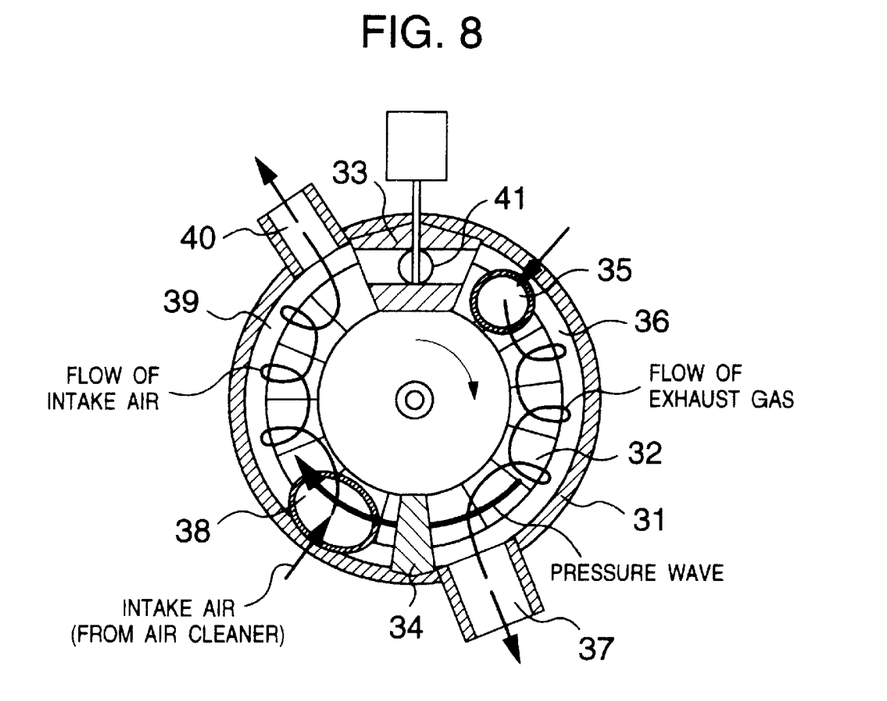
FIG. 8 is a view showing the construction of a fourth embodiment of the invention, which is close to a cross-sectional view thereof in a radial direction.

FIG. 8 shows a fourth embodiment. This embodiment is identical to the second embodiment in the concept that with the combination of an impeller, having blades whose pitch is large, and second partitions 34 having a width smaller than the pitch of the blades, the propagation of pressure waves of exhaust gas is more promoted. In this case, however, since the width of the second partitions 34 is small, an EGR valve as described above for the first embodiment can not be provided. Therefore, an EGR valve 41 is provided in first partitions 3 having a large width. In this embodiment, the impeller 32 of FIG. 6 is used as the impeller, but the impeller 42 of FIG. 7 may be used. In this embodiment, reference numeral 31 denotes a casing, reference numeral 35 an exhaust gas inlet, reference numeral 36 an exhaust gas passage, reference numeral 37 an exhaust gas outlet, reference numeral 38 an intake air inlet, reference numeral 39 an intake air passage, and reference numeral 40 an intake air outlet.

Figure 9:
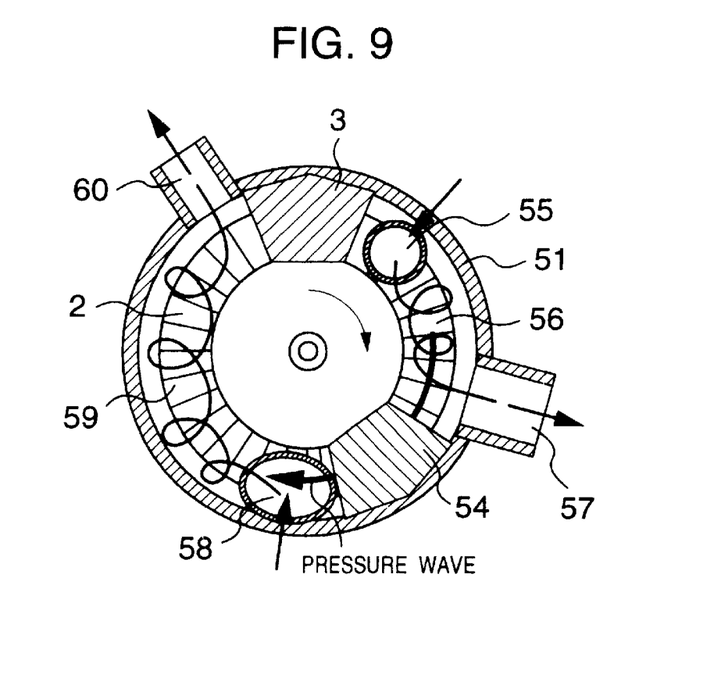
FIG. 9 is a view showing the construction of a fifth embodiment of the invention, which is close to a cross-sectional view thereof in a radial direction.

FIG. 9 shows a fifth embodiment. This embodiment is similar in basic construction to the first embodiment. However, in the first embodiment, the exhaust gas passages are substantially equal in length to the intake air passages whereas in this embodiment, second partitions 54 are disposed closer to exhaust gas inlets 55, so that intake air passages 59 are longer than exhaust gas passages 56.

Although it may be thought that a rotational force, applied to an impeller 2 by the flow of exhaust gas, is somewhat reduced, pressure waves of the exhaust gas can be utilized in a manner equivalent to that of the first embodiment, and a pressure-increasing section, in which the pressure is increased by the rotation of the impeller, is made long because of the longer intake air passages 59, and therefore the pressure-increasing effect, equivalent to or more than that achieved in the first embodiment, can be expected.

The areas of the impeller and casing, with which the exhaust gas is brought into contact, are reduced, and therefore there is achieved an advantage that the temperature rise of the intake air can be decreased. Based on the relation with an overall flow resistance in the exhaust side and intake side, the position of the second partitions 54 can be suitably determined depending on the kind of an engine and an engine system to be used.

In this embodiment, reference numeral 51 denotes the casing, reference numeral 57 an exhaust gas outlet, reference numeral 58 an intake air inlet, and reference numeral 60 an intake air outlet.

Figure 10:
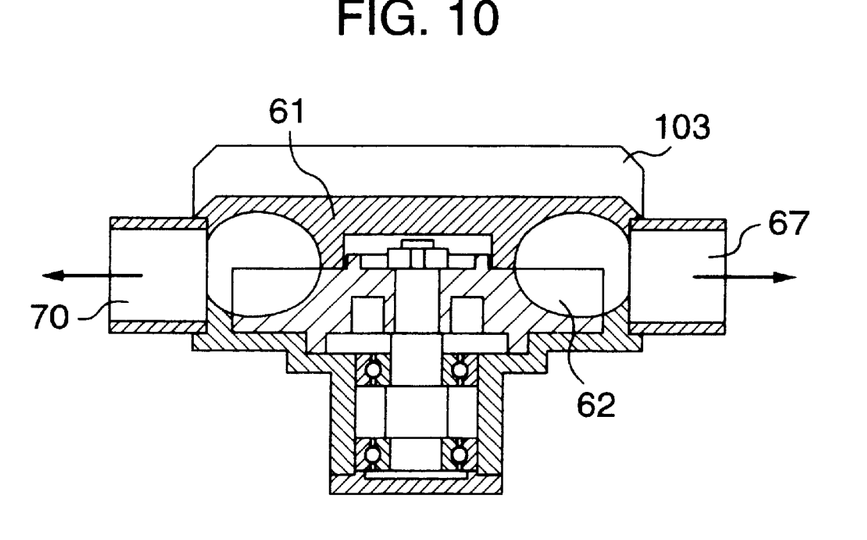
FIG. 10 is a cross-sectional view of a sixth embodiment of the invention in an axial direction.

FIG. 10 shows a sixth embodiment. This embodiment is similar in basic construction to the first embodiment. However, this embodiment differs from the first embodiment (in which there is used the impeller 2 having the blades formed on the opposite sides thereof) in that there is used an impeller 62 having blades formed on one side thereof, and that casing-cooling means, for example air-cooled fins 103, are formed on an end surface of a casing 61. Reference numeral 67 denotes an exhaust gas outlet, and reference numeral 70 an intake air outlet.

When a supercharger is used in an engine with a small displacement, such a single-side blade construction can be used, and a compact design can be obtained. Of course, such a single-side blade construction can be used in an engine with a large displacement if this is required. In this case, however, it is expected that although a thickness of a supercharger body can be made relatively small, a diametrical dimension thereof is increased.

Although not shown in the drawings, depending on the design, there can be provided a construction in which a plurality of impellers of a single-side blade construction or a plurality of impellers of a double-side blade construction can be arranged in a parallel manner or a serial manner.

Figure 11:
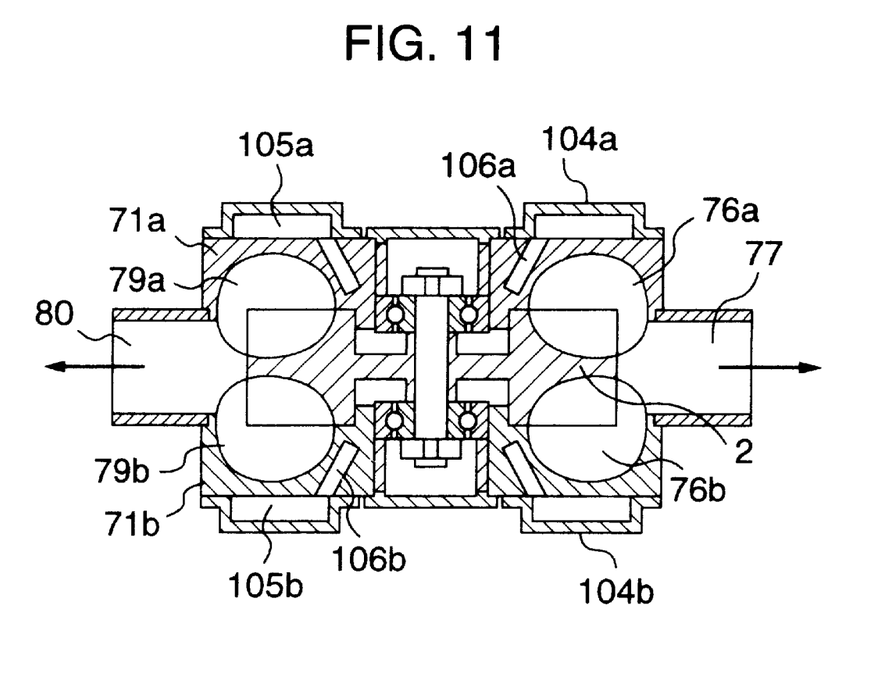
FIG. 11 is a cross-sectional view of a seventh embodiment of the invention in an axial direction.

FIG. 11 shows a seventh embodiment. This embodiment is similar in basic construction to the first embodiment. Water-cooled jackets 104a and 104b (serving as cooling means for cooling casings 71a and 71b), respectively forming water passages 105a and 105b, are additionally formed on end surfaces of the casings 71a and 71b, respectively, and water passages 106a and 106b for promoting the cooling of those portions, disposed in the vicinity of bearings, are formed in the casings 71a and 71b, respectively. Reference numerals 76a and 76b denote exhaust gas passages, reference numeral 77 an exhaust gas outlet, and reference numeral 80 an intake air outlet.

Figure 12:
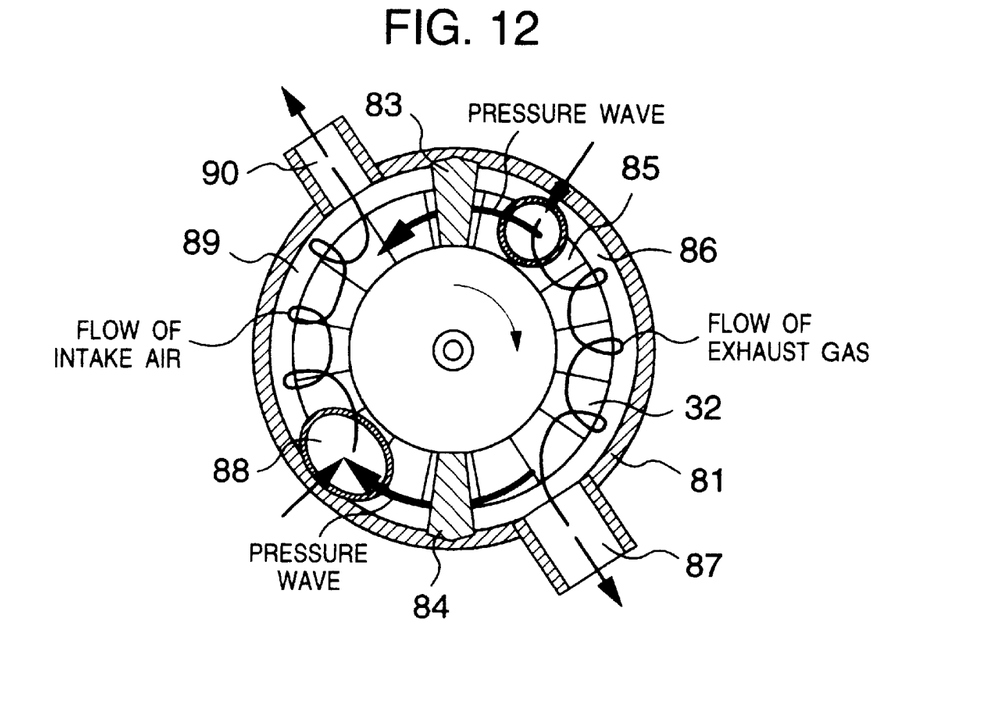
FIG. 12 is a view showing the construction of an eighth embodiment of the invention, which is close to a cross-sectional view thereof in a radial direction.

FIG. 12 shows an eighth embodiment. An impeller 32 has blades whose pitch is large. A width of first partitions 83, as well as a width of second partitions 84, is smaller than the pitch of the blades, so that pressure waves can be applied also from the vicinity of exhaust gas inlets 85 to the vicinity of an intake air outlet 90. The pressure waves are propagated against the flow, but since the pressure waves of exhaust gas of a high pressure are exerted on the intake air outlet 90, the more effective pressure increase can be achieved. The pressure of the exhaust gas in the vicinity of an exhaust gas outlet 87 is lower than the pressure of the exhaust gas at the exhaust gas inlets 85, but since the pressure of the intake air at intake air inlets 88 is also low, the effect of the pressure waves, passing past the second partitions 84, can also be expected. Though the width of the first partitions 83 is small, an amount of leakage of the exhaust gas at the first partitions 83 is small since this leakage fluid flows against the main flow, and therefore this leakage amount is not so increased as compared with the fourth embodiment of FIG. 8.

In this embodiment, the impeller 32 of FIG. 6 is used as the impeller, but the impeller 42 of FIG. 7 may be used. In this embodiment, reference numeral 81 denotes a casing, reference numeral 86 an exhaust gas passage, and reference numeral 89 an intake air passage.

Figure 13:
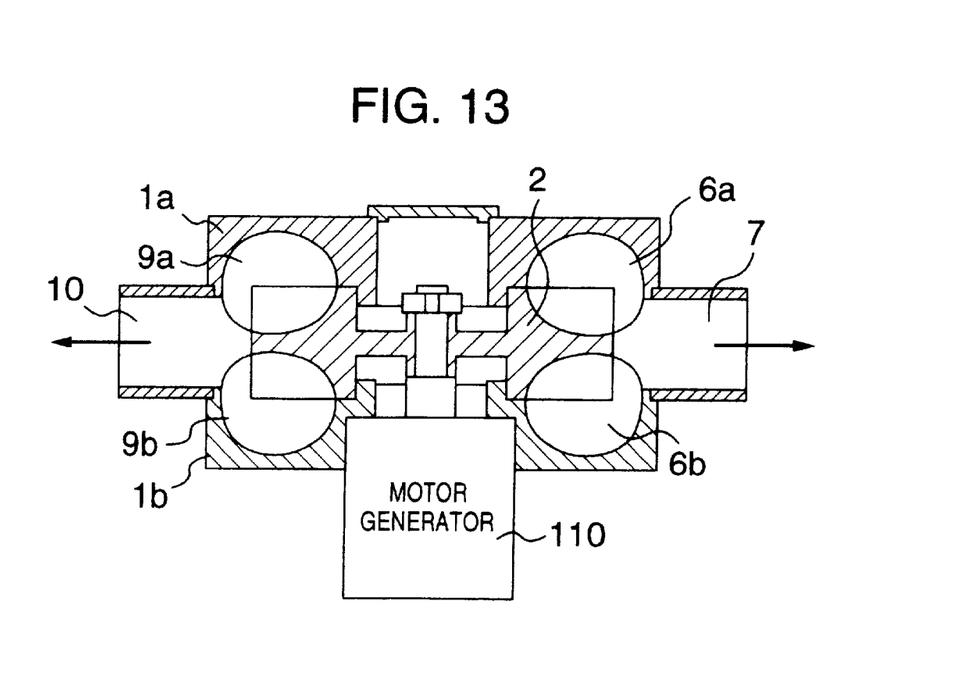
FIG. 13 is a cross-sectional view of a ninth embodiment of the invention in an axial direction.

FIG. 13 shows a ninth embodiment. In this construction, a motor generator 110 is connected to an impeller 2. At the time of starting an engine and during a low-speed operation, the motor generator 110 is used as a motor so as to forcibly rotate the impeller.

In the embodiments described above, the impeller 2 is stopped at the time of starting the engine, and the impeller increase the air intake resistance because of an inertia force of the impeller, which results in a possibility that the engine can not be started satisfactorily. And besides, during a low-speed operation, an amount of the exhaust gas is small, and therefore the rotational speed of the impeller can not be increased, which also results in a possibility that the intake air resistance is increased.

Therefore, by assisting the impeller in rotating by the motor at the time of starting the engine and during a low-speed operation, the good supercharging can be effected, and the problem concerning the incomplete starting of the engine and the problem concerning the air intake resistance during a low-speed operation can both be solved. Under those operating conditions in which the rotational speed of the engine is high, the rotational speed of the impeller 2 increases, and therefore if the supercharger is so designed that the motor generator 110 can function as a generator when the rotational speed of the engine exceeds a certain value, the exhaust gas energy can be recovered as electricity.

Of course, the motor generator 110 may be replaced by an ordinary motor, or a pulley which has a clutch and is operatively connected to the engine through a belt. In the case of the pulley with the clutch, whether the clutch is engaged during a low-speed operation or a high-speed operation is determined depending on the type of system to be used.

In the above embodiments of the present invention, there are achieved the superchargers for the engine at low costs, in which the pressure energy, possessed by the exhaust gas of the engine, is exerted as the pressure waves directly on the intake air, and also the flow energy is recovered as the rotational force, and is used to increase the pressure of the intake air, and by doing so (that is, utilizing both of these operations), the good supercharging can be effected over a wide range of the engine speed from a low speed to a relatively high speed.

Figure 14:
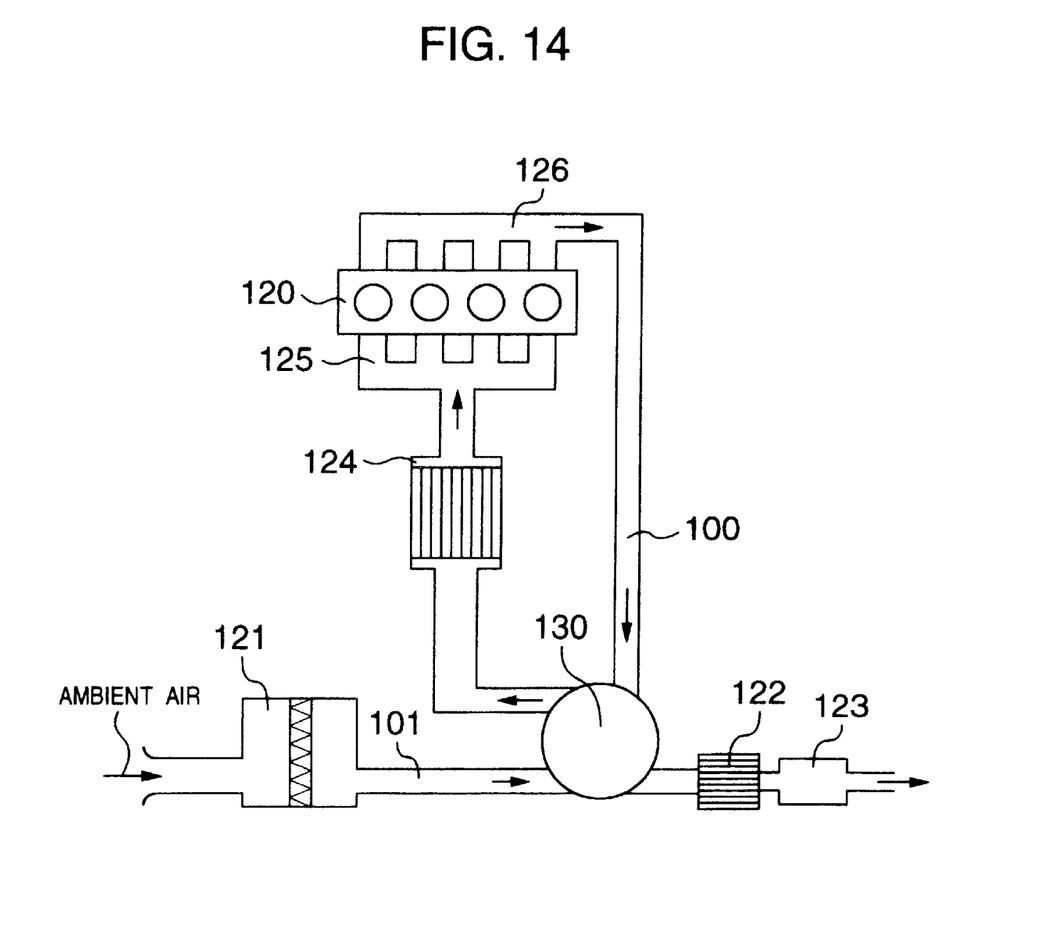
FIG. 14 is a system diagram showing one example of engine intake-exhaust system employing a supercharger of the invention.

FIG. 14 is a system diagram showing one example of engine intake-exhaust system employing an eddy-flow blade supercharger of the present invention. Exhaust gas from an engine 120 passes through an exhaust manifold 126 and an exhaust duct 100, and flows into the eddy-flow blade supercharger 130 to rotate an eddy-flow impeller, and then is discharged to the exterior via a catalyst 122 and a muffler 123. On the other hand, intake air for the engine passes through an air cleaner 121 and an intake duct 101, and flows into the supercharger 130 to undergo pressure waves of the exhaust gas and also to undergo a pressure-increasing effect by the eddy-flow impeller, so that the intake air is pressurized. The intake air receives heat of the high-temperature exhaust gas in the supercharger 130, and therefore a cooler (air cooler) 124 is provided upstream of the engine so as to decrease the temperature of the intake air. This construction is basically similar to the construction of an engine intake-exhaust system employing a conventional supercharger. In FIG. 14, reference numeral 125 denotes an intake manifold.

Figure 15:
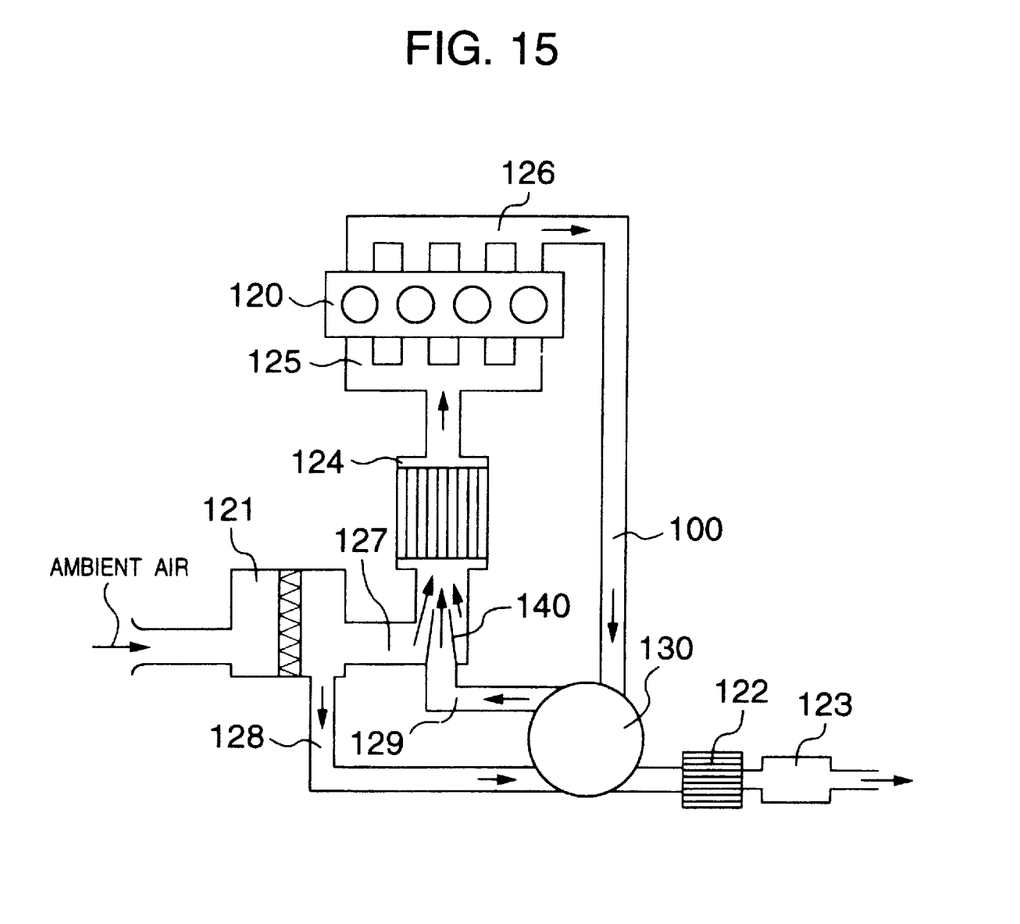
FIG. 15 is a system diagram showing another example of engine intake-exhaust system employing a supercharger of the invention.

FIG. 15 is a system diagram showing another example of engine intake-exhaust system employing an eddy-flow blade supercharger of the present invention. An exhaust system is similar to that of FIG. 14, but a supercharger intake duct 128, which is separate from a main intake duct 127, is provided on and extends from an air cleaner 121, and this duct 128 is connected to the eddy-flow blade supercharger 130, and part of intake air is increased in pressure, and is fed to the main intake duct 127 via a discharge duct 129 and an ejector nozzle 140. With this construction, although an amount of the intake air to be supplied to the supercharger is reduced, the degree of the pressure increase can be made greater, and also the supercharger 130 can be of a small or compact size.

Figure 16:
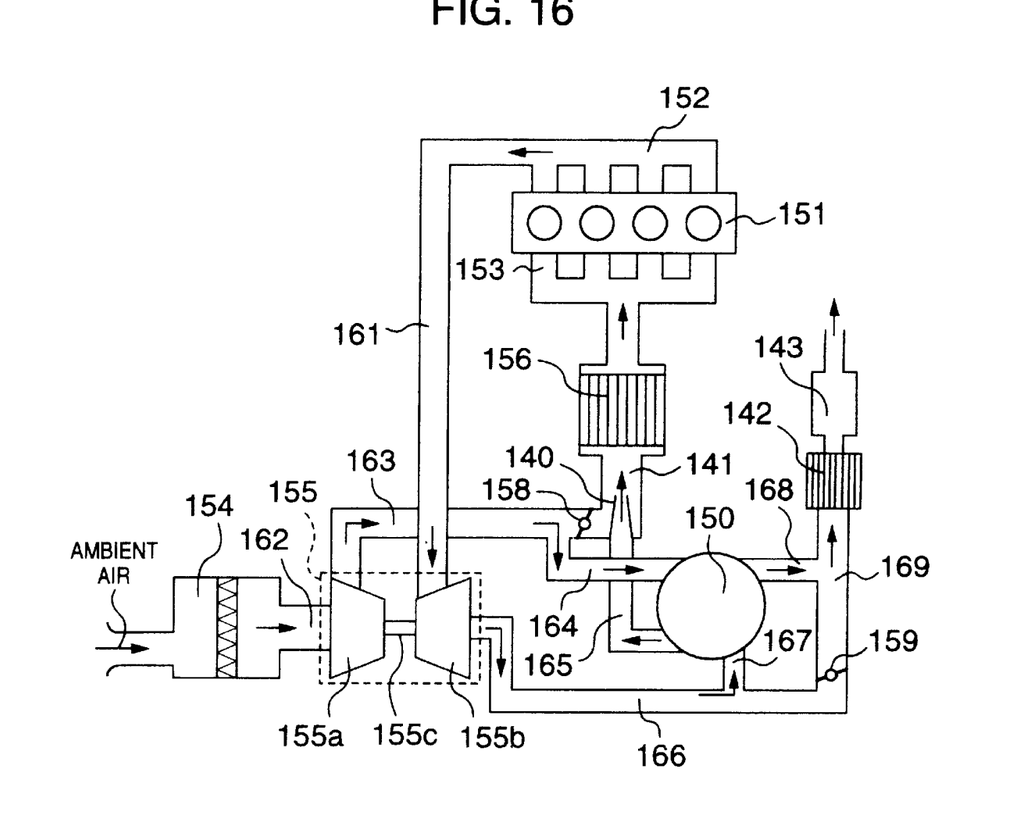
FIG. 16 is a system diagram showing a further example of engine intake-exhaust system employing a supercharger of the invention.

FIG. 16 is a system diagram showing a further example of engine intake-exhaust system employing an eddy-flow blade supercharger of the present invention. In this construction, the application of an eddy-flow supercharger of the present invention to an engine, having a larger displacement and a larger power output, is effective as compared with the construction of FIG. 15. Flows of gases (indicated by arrows) and the conditions of valves 158 and 159, which are shown in FIG. 16, represent an operating condition in which an engine in this system is being operated at a low rotational speed under a high load. Exhaust gas from the engine 151 passes through an exhaust manifold 152 and an exhaust duct 161, and is fed to a turbine 155*b* of a turbocharger 155 of the conventional type to rotate the turbine 155*b*, thereby rotating a centrifugal blade compressor 155*a* through a shaft 155*c*. In this condition, however, since the engine is at a low rotational speed, the flow rate of the exhaust gas is small, and also since the rotational speed (number of revolutions) of the turbine 155*b* is low, a pressure-increasing function of the turbocharger is insufficient. Therefore, the exhaust gas, discharged from the turbine 155b, is fed via pipes 166 and 167 to the eddy-flow supercharger 150 of the present invention to operate the same. At this time, the valve 159 is fully closed. The exhaust gas, which has operated the eddy-flow supercharger 150, is discharged to the exterior via pipes 168 and 169, a catalyst 142 and a muffler 143. On the other hand, intake air is drawn into an intake duct 162 through an air cleaner 154, and flows into the centrifugal blade compressor 155*a* of the turbocharger 155. However, since the increase of the pressure of the intake air is insufficient as described above, the valve 158, provided in a pipe 163, is closed so as to feed the intake air to the eddy-flow supercharger 150 via a bypass pipe 164, provided upstream of the valve 158, thereby further increasing the pressure of the intake air. The intake air, thus increased in pressure and heated, is fed to a main intake passage 141 via a pipe 165 and an ejector nozzle 140, and is cooled by a cooler 156, and then is supplied to the engine 151 via an intake manifold 153.

Figure 17:
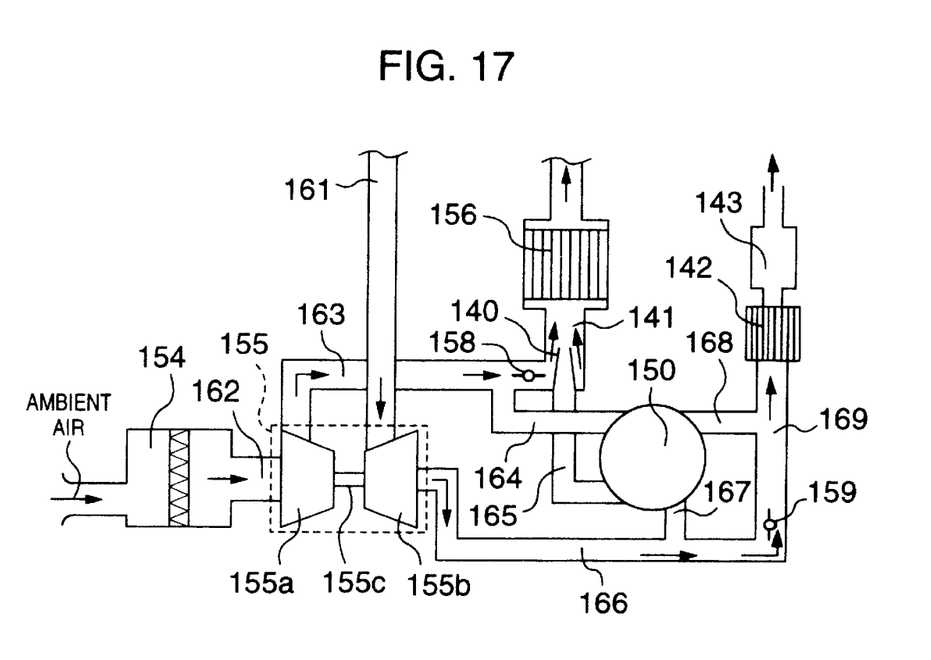
FIG. 17 is a view showing the system of FIG. 16 in a condition in which the engine is being operated at a low speed under a low load.

FIG. 17 shows a condition of the above system in which the engine is being operated at a low speed under a low load so that the supercharging is not particularly needed, and the valves 158 and 159 are fully opened so as to reduce the flow resistance to a minimum. At this time, the eddy-flow supercharger is hardly operated.

Figure 18:
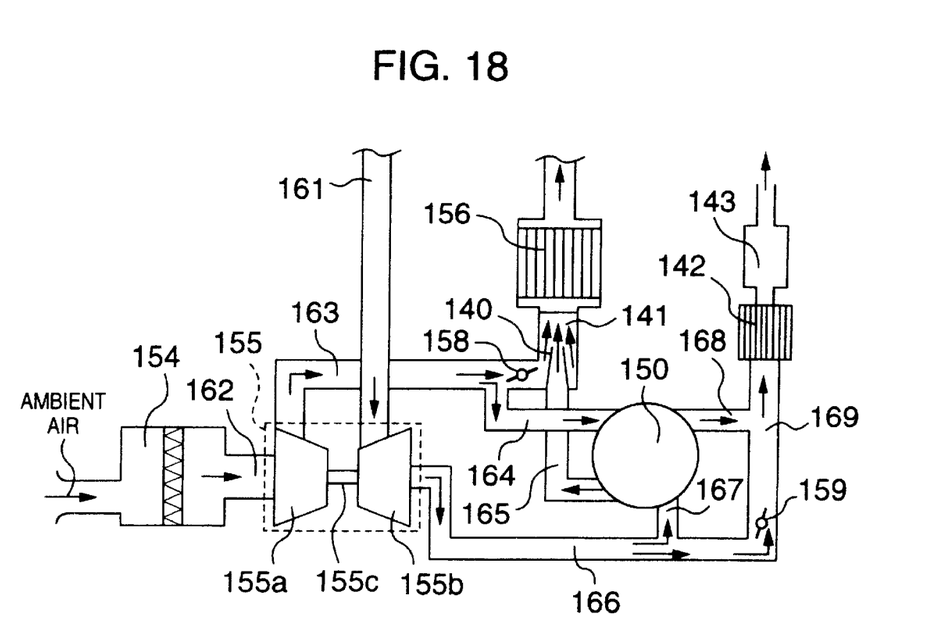
FIG. 18 is a view showing the system of FIG. 16 in a condition in which the engine is being operated at a medium or a high speed under a medium or a high load.

FIG. 18 shows a condition of the above system in which the engine is being operated at a medium or a high rotational speed under a medium or a high load so that the supercharging is particularly needed, and the opening of each of the valves 158 and 159 is set to a medium degree, thereby first providing such conditions that the turbocharger 155 of the conventional type can effectively operate. At this time, the exhaust gas, discharged from the turbocharger 155, still have the residual energy, and by suitably setting the degree of opening of the valve 159, the exhaust gas is bypassed to the eddy-flow supercharger 150 to operate the same. At this time, the intake air, fed from the eddy-flow supercharger 150 to the main intake passage 141 via the ejector nozzle 140, imparts an induction effect to the whole of the intake air, so that the absolute flow rate of the intake air can be made larger as compared with the condition in which the eddy-flow supercharger is not operated. Namely, the more effective supercharging is achieved.

Although not shown in the drawings since the piping is rather complicated, there can be proposed a system in which the eddy-flow supercharger of the present invention is used in parallel relation to a conventional turbocharger.

What is claimed is:

1. A supercharger for an engine comprising a disk-like impeller having a plurality of blades formed on an outer peripheral portion thereof, and a casing within which said impeller is rotatably received, said casing forming a ring-like fluid passage around said plurality of blades;

wherein a first partition and a second partition are provided in said fluid passage to divide said fluid passage into a first fluid passage and a second fluid passage, and an exhaust gas inlet for introducing exhaust gas of the engine is provided in that portion of said first fluid passage disposed adjacent to said first partition, and an exhaust gas outlet is provided in that portion of said first fluid passage disposed adjacent to said second partition, and an intake air inlet for drawing air is provided in that portion of said second fluid passage across said second partition from said exhaust gas outlet, and an intake air outlet is provided in that portion of said second fluid passage across said first partition from said exhaust gas inlet.

2. A supercharger according to claim 1, in which a gap for allowing pressure waves of said exhaust gas pass through is formed between at least one of said first and second partitions and ends of said blades of said impeller.

3. A supercharger according to claim 1, in which a width of said first partition, as well as a width of said second partition, is smaller than the pitch of said blades of said impeller.

4. A supercharger according to claim 1, claim 2 or claim 3, in which said impeller has said plurality of blades formed on opposite sides thereof at the outer peripheral portion thereof, and said blades, formed on one side of said impeller are staggered with respect to said blades formed on the other side thereof.

5. A supercharger according to claim 1, in which at least one of said exhaust gas inlet and said intake air inlet is so arranged that a flow of said exhaust gas through said exhaust gas inlet or a flow of the air through said intake air inlet is substantially parallel to an axis of said impeller, and at least one of said exhaust gas outlet and said intake air outlet is so arranged that a flow of the air through said exhaust gas outlet or a flow of the air through said intake air outlet is directed radially outwardly of said impeller.

6. A supercharger according to claim 1, in which casing-cooling means is provided on an outer end surface of said casing disposed substantially parallel to said fluid passage.

7. A supercharger according to claim 1, in which an exhaust gas passage for circulating the exhaust gas and a valve device for opening and closing said exhaust gas passage are provided in one of said first and second partitions.

8. A supercharger according to claim 1, in which an external drive mechanism for assisting said impeller in rotating is connected to said impeller.

9. A supercharging system for an engine employing said supercharger as defined in claim 1, in which the air, pressurized by the eddy flow-type supercharger, is ejected through an ejector nozzle directed toward a downstream portion of a main intake air passage.

10. An engine supercharging system employing a turbocharger using a centrifugal impeller, wherein said turbocharger and a supercharger as defined in claim 1 are used in combination with each other.

11. A supercharger for an engine wherein intake air is increased in pressure by the use of exhaust gas flowed into said supercharger from said engine, and is fed to said engine;

wherein an impeller, having a plurality of blades formed on an outer peripheral portion thereof, is received within a casing, and a ring-like fluid passage is formed around said plurality of blades, and a first partition and a second partition are provided in said fluid passage to divide said fluid passage into an exhaust gas passage and an intake air passage, and there is provided a fluid machine construction for causing said exhaust gas to flow into and out of said exhaust gas passage, and for causing said intake air to flow into and out of said intake air passage, and pressure energy, possessed by said exhaust gas in said exhaust gas passage, is exerted as pressure waves on the intake air in said intake air passage, and also flow energy, possessed by said exhaust gas, is recovered as a rotational force for rotating said impeller, thereby increasing the pressure of said intake air.

* * * * *